(12) United States Patent
Hoffman et al.

(10) Patent No.: US 6,685,761 B1
(45) Date of Patent: Feb. 3, 2004

(54) METHOD FOR PRODUCING BENEFICIATED TITANIUM OXIDES

(75) Inventors: Glenn E. Hoffman, Lancaster, SC (US); Ronald D. Gray, Bethel Park, PA (US)

(73) Assignee: Midrex International B.V. Rotterdam, Zurich Branch, Zurich (CH)

( * ) Notice: Subject to any disclaimer, the term of this patent is extended or adjusted under 35 U.S.C. 154(b) by 0 days.

(21) Appl. No.: 10/392,430

(22) Filed: Mar. 19, 2003

Related U.S. Application Data

(63) Continuation-in-part of application No. 09/888,962, filed on Jun. 25, 2001, now Pat. No. 6,582,491, which is a continuation-in-part of application No. 09/429,973, filed on Oct. 29, 1999, now Pat. No. 6,251,156.
(60) Provisional application No. 60/106,433, filed on Oct. 30, 1998.

(51) Int. Cl.$^7$ ................................................. C21B 3/06
(52) U.S. Cl. ........................ 75/10.63; 75/435; 75/485; 266/177; 423/85
(58) Field of Search ................ 74/435; 75/10.63, 75/485; 266/177; 423/85

(56) References Cited

U.S. PATENT DOCUMENTS

| | | |
|---|---|---|
| 3,765,868 A | 10/1973 | Moblebust |
| 4,395,285 A | 7/1983 | Merkert |
| 4,701,214 A | 10/1987 | Kaneko et al. |
| 4,731,112 A | 3/1988 | Hoffman |
| 5,730,775 A | 3/1998 | Meissner et al. |
| 6,306,195 B1 * | 10/2001 | Das et al. ................. 75/435 |

* cited by examiner

Primary Examiner—Melvyn Andrews
(74) Attorney, Agent, or Firm—Dougherty, Clements & Hofer

(57) ABSTRACT

The invention is a method and apparatus for producing beneficiated titanium oxides using a modified rotary hearth furnace, that is a finisher-hearth-melter (FHM) furnace. In the method the refractory surface of the hearth is coated with carbonaceous hearth conditioners and refractory compounds, where onto said hearth is charged with pre-reduced agglomerates. The pre-reduced agglomerates is leveled, then heated until molten, and then reacted with the carbon and reducing gas burner gases until any residual iron oxide is converted to iron having a low sulfur content. Fluid slag and molted iron forms melted agglomerates. The fluid slag is rich in titanium. The melted agglomerates are cooled, and then the melted agglomerates and the hearth conditioners, including the refractory compounds, are discharged onto a screen, which separate the melted agglomerates from the hearth conditioner. The hearth conditioner is recycled, and the melted agglomerates are prepared for sale or for additional treatment in a final melter, where the final melter is preferably an electric furnace. Exhaust gases from the FHM furnace are recovered for calcining coal into fuel gases and coke.

33 Claims, 8 Drawing Sheets

METHOD FOR PRODUCING BENEFICIATED TITANIUM OXIDES

CROSS-REFERENCE TO RELATED APPLICATION

This application is a continue-in-part claims the benefit of U.S. application Ser. No. 09/888,962, filed on Jun. 25, 2001, which is further claims the benefit of U.S. application Ser. No. 09/429,973, filed on Oct. 29, 1999, which further claims the benefit of U.S. Provisional Application No. 60/106,433, filed on Oct. 30, 1998.

FIELD OF THE INVENTION

The invention relates to an improved method for the beneficiation of titanium oxides. More particularly, the invention relates to a method of using a combination of furnaces operated under unique process conditions to effect the continuous beneficiation of titanium oxides from low-grade titanium materials and the production of iron.

BACKGROUND OF THE INVENTION

Mokleust, in U.S. Pat. No. 3,765,868, teaches a method for the selective recovery of metallic iron and titanium oxide values from ilmenites. The primary object of the invention is to provide an efficient and economical process for the selective recovery of metallic iron and titanium oxide values in high yields from lower grades of titanium ores, such as rock and beach sand ilmenites. The titanium oxides are recovered in the form of slag, containing 75 to 100% by weight of titanium oxide. The process of his invention involves electric arc smelting at high temperatures of substantially completely pre-reduced ilmenites.

In 1983, in U.S. Pat. No. 4,395,285, Merkert taught a low density, porous compact of prepared mix containing silica fume, finely divided carbonaceous reducing agents such as petroleum coke or coal, and optimally with iron and a binder.

In 1987, in U.S. Pat. No. 4,701,214, Kaneko et al. taught reduction by utilizing off gas generated by a smelting furnace in a moving hearth furnace. A method of operation was promoted which required less energy and a smaller smelting furnace by introducing gaseous reductants and fuel into the moving hearth furnace.

In 1987, in U.S. Pat. No. 4,731,112, Hoffman taught a method of making a molten ferroalloy product in a melting furnace from a feed briquette of metallized iron, granulated alloy metal oxide, and a carbonaceous material.

In 1998, in U.S. Pat. No. 5,730,775, Meissner et al. taught an improved method known by the trade name or trademark of FASTMET, which is an apparatus for producing direct reduced iron from iron oxide and iron bearing and carbon agglomerates that are layered no more than two layers deep onto a moving hearth, and are metallized by heating the agglomerates to temperatures of approximately 1316° C. to 1427° C. for a short time period. For a general understanding of the recent art, U.S. Pat. No. 5,730,775 is incorporated herein by reference.

All major iron making processes require the input of iron bearing materials as process feedstocks. A broadly used iron source is a product known as Direct Reduced Iron ("DRI") which is produced by the solid state reduction of iron ore or iron oxide to metallized iron without the formation of liquid iron. Metallized in this sense, and throughout this specification, does not mean coated with metal, but means substantially reduced to the metallic state.

Improvements are sought within the industry for furnace modifications and improved methods of operation that provide for efficient, continuous production of titanium dioxide that is of sufficient purity that it can be processed as rutile, and simultaneously the production of high purity iron with a range of carbon content in which iron oxides are efficiently reduced to purified iron in the process, while slag components are separated from the purified iron as beneficiated titanium oxides.

The invention also in turn relates to charging hot, pre-reduced agglomerates containing highly metallized DRI and titanium oxide product to an ITmk3 "Finisher" furnace to effect melting of the DRI to produce melted agglomerates of nuggets of pure iron, which contain no gangue components, and fluid slag of titanium oxides that contain less than 10% gangue.

ITmk3 furnace technology was developed by Kobe Steel, LTD of Osaka, Japan, to separate metal from iron ore using coal. Briefly, ITmk3 technology employs a pellet of finely ground iron ore compounded with coal dust and a binder, to metallize the iron oxide into iron, melt and express slag, and then a means to separate a hot iron nugget from the slag.

Titanium is the world's ninth most abundant element, being about one fifth the abundance of iron. Titanium occurs in complex oxides, usually in combination with iron, and also with the alkaline earth elements. Titanium is commonly found as ilmenites, either as a sand or a hard rock deposit. Low-grade titanium ores, such as ilmenite sand are 45–65% $TiO_2$, 55–35% iron, and 5–10% gangue. Rock deposits of ilmenites are reported to be 45–50% $TiO_2$, 45–50% iron, and 5–10% gangue. The generalized formula for ilmenite is $Fe^{II}Ti^{IV}O_3$, where from inspection it is apparent that iron is Iron II, and titanium is Titanium IV. Titanium also exists naturally at much higher grades. Rutile, which is relatively rare, is 92+% $TiO_2$.

SUMMARY OF THE INVENTION

The present invention is a method and an apparatus for producing beneficiated titanium oxides from low-grade titanium materials containing iron, such as ilmenite. The invention minimizes the generation of gangue whose formation is commonly attendant to the process of reducing the iron oxide to iron. Gangue accrues in the fluid slag, and lowers the purity of the titanium. The source for the gangue is the reductant, which is commonly admixed with the titanium ore (ilmenites) to reduce iron oxide to iron. Coke and coke breeze are commonly employed as reductants, and the ash which is generated as a by-product, contributes to the gangue. Similar problems are also encountered with other reductants such as coal powder and coal fines. Reductants that are high in sulfur require that slag formers, such as limestone and lime, be added to remove the sulfur. Slag formers extract the sulfur and add to the slag layer, therein serving to lower the relative concentration of the titanium in the slag. The invention also reduces the total energy required for the beneficiation of the titanium oxides through the conservation of energy, the process by which the iron is reduced and through the conservation of materials.

The invented method continuously feeds titanaceous material containing iron oxide and carbon compounds into a sequence of hot process steps. The first hot process step employs a moving hearth, kiln or shaft furnace, operating below the melting point of the material, which effects pre-reduction of the material. The exit material from the moving hearth furnace is continuously and preferably hermetically introduced either directly into an electric melter or an intermediate hearth furnace operating at temperatures sufficient to melt the pre-reduced agglomerates therein forming melted agglomerate. The pre-reduced agglomerates exiting the pre-reduction furnace is preferably never exposed to air or cooled between the exit port of the pre-reduction furnace and entry into the electric melter. The invented method produces beneficiated titanium oxide and a high purity iron containing a specified percentage of carbon. Starting materials are introduced into the moving hearth pre-reduction process in layers in the form of agglomerates (e.g. pelletized or compressed material). Pre-reduced material from the moving hearth step is fed continuously and directly into the central interior area of the electric melter. The electric melter is maintained at a temperature exceeding the melting point of the material and the ingress of oxygen is minimized to guarantee efficient reduction. High purity iron product and beneficiated titanium oxide are periodically removed from the electric melter.

Utilizing a pre-reduction step of heating iron-bearing agglomerates in a moving hearth furnace, then directly and continuously feeding the carbon-containing metallized iron into an electric melter effectuates a very high iron content product having high percentages of carbon. Moreover, melting process conditions are such that the sulfur content is minimized and titanium oxides of titanium II, III and IV are produced.

The optional use of an intermediate hearth furnace, which employs ITmk3 furnace technology (such as a "finishing hearth melter" (FHM)), enables energy savings and increased production.

An extremely desirable high iron content product is provided for use by the steelmaking industry, and a beneficiated titanium oxide is produced for the pigment industry.

OBJECTS OF THE INVENTION

The principal object of the present invention is to provide a method of achieving efficient reduction of iron oxide bearing materials and beneficiation of titanium oxide bearing materials, such as ilmenites, at elevated temperatures in a series of furnaces.

Another object of the invention is to provide a method of achieving efficient continuous production of high purity liquid iron having concentrations of about 1% to about 5% carbon at elevated temperatures in a series of furnaces with separation of titanaceous slag components from the purified liquid iron-carbon end product.

An additional object of the invention is to provide a method of desulfurizing high purity iron and reducing contaminants in direct reduced iron by continuously feeding an electric melter.

The objects of the invention are met by a method for producing highly purified iron and low percentage carbon product from iron oxide bearing materials, comprising the steps of providing a furnace for direct reduction of titanium and iron oxide bearing materials containing carbon in the form of agglomerates, layering the titanium and iron oxide and carbon bearing agglomerates in the furnace, pre-reducing iron oxide and carbon agglomerates, accomplishing the pre-reducing step in a moving hearth, kiln or DRI shaft furnace, the pre-reducing step producing pre-reduced agglomerates with hot carbon-containing metallized iron, then using an electric melter furnace for receiving pre-reduced agglomerates, the second hot process step includes placing said electric melter furnace in close proximity to the moving hearth furnace. After the moving hearth furnace step, the hot, pre-reduced agglomerates are used to directly and continuously charge an electric melter. The charge is inserted into the central interior area of the electric melter nearest the molten iron bath/electrode interface, or in other electric melters, inserted into the region of minimum slag, effecting rapid heating of the carbon-containing metallized iron to liquefying temperatures while minimizing the ingress of oxygen to assure optimum reduction conditions. Lastly, high purity iron product and fluid titanaceous slag from the electric melter are periodically withdrawn without interrupting the continuous operation of the furnaces. The method of utilizing a pre-reduction step of heating carbon-containing titanium and iron oxide agglomerates in a moving hearth furnace, and directly, continuously and hermetically feeding the hot, solid carbon-containing metallized iron from this furnace into an electric melter provides a high iron content product having high percentages of carbon and a slag with a high concentration of titanium dioxide and low content of gangue. When an intermediate FHM furnace is used the method comprising the steps of: forming agglomerates comprised of low-grade titanium oxide materials containing iron and iron oxides admixed with a finite quantity of carbonaceous materials; pre-reducing said agglomerates, by heating said agglomerates at a temperature of about 700° C. to about 1500° C., preferably in the presence of reformed gases, therein producing pre-reduced agglomerates comprised of titanium oxides and at least partially metallized carbon-containing iron; discharging said pre-reduced agglomerates at a temperature of about 700° C. to about 1350° C.; introducing hearth conditioning carbonaceous materials into a moving hearth furnace having a refractory surface, and uniformly placing said hearth conditioning carbonaceous materials on said refractory surface; charging the refractory surface of the hearth furnace with the pre-reduced agglomerates; heating and reacting said pre-reduced agglomerates in said hearth furnace to a temperature sufficient to complete the metallization of iron, wherein the heating produces melted agglomerates of iron product and slag, wherein the iron product is substantially comprised of iron, and the slag is substantially comprised of titanium oxides; discharging the melted agglomerate into an electric melter; heating and melting the pre-reduced high carbon hot metallized iron agglomerates in the electric melter at a temperature of about 1300° C. to about 1700° C. to form high carbon molten iron and fluid slag which is rich in titanium oxides; preventing oxidation of the high carbon molten iron via minimization of the ingress of oxygen containing gas in said continuously introducing and heating steps; carburizing the high carbon molten iron to form high carbon molten metallized iron; purifying the high carbon molten metallized iron by reducing titanium oxides to titanium II, III or IV and desulfurizing the high carbon molten metallized iron to produce high purity high carbon molten iron product; discharging high purity high carbon molten iron product from the electric melter; and tapping the melter to draw off beneficiated titanium oxides; and maintaining a minimum molten iron heel of about 1 to about 4 times the quantity of the intermittently tapped iron product.

The pre-reduced agglomerates are prepared utilizing established gas or coal-based direct reduction technologies (DRI) that employ low sulfur syngas, natural gas or coal. The DRI technology produces a number of benefits, including: a high degree of process control, high process fuel and thermal efficiency, low gangue formation in the slag and in the reduced iron product (typically less than 5%), and low sulfur. In the presence of carbon, iron oxide is reduced to iron and carbon monoxide (Rx 1). In the presence of carbon monoxide, whether produced in situ by the reaction with iron II or introduced as a reformed gas, the reduction of iron II to the metal is shown in the second formula (Rx 2).

$$Fe^{II}Ti^{IV}O_3 + C \rightarrow CO + Fe^0 + Ti^{IV}O_2 \quad \text{(Rx 1)}$$

$$Fe^{II}Ti^{IV}O_3 + CO \rightarrow CO_2 + Fe^0 + Ti^{IV}O_2 \quad \text{(Rx 2)}$$

The pre-reduced agglomerates are preferably hot charged into the moving "finisher" hearth melter (FHM) furnace whereby controlled melting can be effected to produce melted agglomerates, where the iron nuggets (having a content of 0.01–4% carbon) that is virtually free of gangue and a slag that contains a high titanium oxide content. Residual carbon contained in the hot reduced iron product is available for further reduction of residual iron oxide. The furnace contains a layer of hearth carbonaceous materials, which acts as a source of reductant that will largely be operative in the gas phase, as combustion gases ($CO_2$ & $H_2O$) in the furnace are in equilibrium with the hearth carbonaceous materials (Rx 3 and Rx 4).

$$CO_2 + C^0 \rightarrow 2CO \quad \text{(Rx 3)}$$

$$H_2O + C^0 \rightarrow H_2 + CO \quad \text{(Rx 4)}$$

As previously enumerated, prior to charging the hot pre-reduced agglomerates to the FHM furnace refractory surface, the hearth surface is covered with hearth conditioning carbonaceous materials, comprised of a hearth conditioner which is a hearth carbonaceous material, such as graphite, anthracite coal, petroleum coke, etc, and may also contain refractory compounds, such as $SiO_2$, CaO, alumina, bauxite, $CaF_2$ (fluorspar), magnesia, magnesite, etc. A portion of the hearth conditioning carbonaceous material acts as a source of solid carbon that diffuses into the metallic iron to lower the effective melting point and to promote formation of nuggets. The remainder of the hearth conditioning carbonaceous material acts as a protective layer which supports nascent molten agglomerates which become substantially iron nuggets and titanium rich slag, and prevents penetration of liquid iron/fluid slag into the hearth refractory. Some of the carbonaceous material is oxidized by the burner combustion products to form carbon monoxide and hydrogen, which are reductants. The reductants will largely be operative in the gas phase, as combustion gases ($CO_2$ & $H_2O$) in the furnace are in equilibrium with the carbonaceous materials (Rx 5 and Rx 6).

$$CO_2 + C^0 \rightarrow 2CO \quad \text{(Rx 5)}$$

$$H_2O + C^0 \rightarrow H_2 + CO \quad \text{(Rx 6)}$$

As previously enumerated, carbon monoxide is a reductant, and it acts to reduce iron oxide to elemental iron.

Provision is also made in the invented process to coat or dust the outer surface of the pre-reduced agglomerates with a powdered carbonaceous material, where the powdered carbonaceous material is usually very similar to the hearth conditioner carbonaceous material. The pre-reduced agglomerates are coated just prior to being charged onto the hearth surface. The pre-reduced agglomerates are charged hot (from 500° C. to ~900° C.), and the energy required for subsequent heating/melting is significantly lower than that required for conventional RHF (rotary hearth furnace) operation which includes the energy required for initial heating and pre-reduction. It is estimated that the burner fuel requirement is <0.7 Gcal/mt-nuggets. Also, the FHM furnace residence time is significantly reduced, ~50%, from 12 to approximately 6 minutes or less. Cold pre-reduced agglomerates can also be charged to the FHM furnace, but the energy requirement is greater, and the residence time is longer. The nominal discharge temperature of the melted agglomerates from the FHM furnace is in the range of about 1300° C. to about 1800° C. These temperatures are relatively low in light of the fact that titanium dioxide has a melting temperature of 1825° C. to 1830° C. Titanium oxide has a slightly lower melting temperature of 1750° C., which suggests that some of the titanium IV is reduced to titanium II. The rule of thumb is that the purity of the titanium dioxide in the slag improves as the temperature is increased. Alternatively stated, there is better fractionation between the slag and nugget, such that more of the titanium is concentrated in the slag. Also, the higher the temperature, the lower the carbon content in the nugget. A discharge temperature in the range of 1300° C. to greater than 1430° C. produces iron with a carbon content of approximately 0.3%. If higher carbon content in the iron is desired, then lower discharge temperatures are required. Iron has a melting point of 1535° C., while iron II has a melting point of 1420° C., and iron III has a melting point of 1565° C. Carbon tends to lower the melting point of iron. The FHM furnace is capable of facilely producing melted agglomerates that have a higher carbon content in the iron than the usual RHF DRI product.

The atmosphere in the FHM furnace (reducing in nature such that a minimum of 10% combustibles is present) can be generated by air/fuel burners, where fuel is preferably (but not limited to) fuel gas or natural gas (or an equivalent mixture of fuel gases having a heating value similar to natural gas), and process air, where both the fuel gas and the process air are preheated to 450~700° C. by means of conventional heat recuperation means applied to the FHM furnace off-gas. Other suitable fuels could be waste oil, coal, etc. Some possibilities for generating a portion or possibly all of the fuel gas requirements for the FHM furnace burners can be achieved by either heating (de-volatizing) or calcining the coal required for the hearth conditioning step by diverting a portion of the conditioned spent flue gas exiting the FHM furnace to an indirect heater, or a fluid bed type calciner.

After being discharged from the FHM furnace, the melted agglomerates are hot screened, preferably by a water-cooled moving screen system whereby the melted agglomerates are physically separated from the hearth conditioning carbonaceous materials. The melted agglomerates can be quenched, or they may be fed directly to a final melter (preferably an electric furnace such as continuous Soderberg, or a channel induction melting furnace having a substantial liquid iron heel), while underside carbonaceous hearth protection material and any mini-molten agglomerates can be cooled, magnetically separated and then recycled back to the FHM furnace. The channel induction furnace is the preferred melter for this application due to the fact that the energy requirement for melting the molten agglomerates is low (120~200 kWh/mt), the melter charge is a blend of iron and titanium dioxide with very little gangue. The gangue can attack the refractory lining in the heating coils. The molten agglomerates are then re-melted in the final melter where the liquid metal bath chemistry can be adjusted by small alloying additions. The final melter can then be tapped (intermittently or continuously), and the molten iron stream directed to a tundish that meters liquid iron to a continuous caster. The fluid slag is tapped (intermittently or continuously), and the titanium dioxide is delivered to casting or granulating equipment. The invented process and apparatus eliminates the need for ladles and large overhead cranes.

The agglomerates can further be comprised of a binder and formed in briquettes. The binder can be traditional binder, such as molasses and water, and less well-known binders based on organic polymers, such as acrylics, acrylonitriles, polyamides, polyimides, polyalkenes, polyurethanes or copolymers and blends thereof, cellulosic fibers such as cotton, paper, wool and synthetic blends thereof, and carbon based fibers, such as graphite and carbon fibers. The cellulosic fibers are of particular utility as only small quantities are required (<2% on the total weight of the agglomerate) to produce an agglomerate that is resistant to break down when processed into a pre-reduced agglomerate, and a melted agglomerate.

BRIEF DESCRIPTION OF THE DRAWINGS

The invention will become more readily apparent by referring to the following detailed description and the appended drawings in which:

FIG. 8a shows the hearth with the hearth conditioning materials.

FIG. 8b illustrates a means for distributing the pre-reduced agglomerates evenly onto the hearth.

DETAILED DESCRIPTION OF THE ILLUSTRATED EMBODIMENT

The invention is a method for the beneficiation of titanium oxides. More particularly, the invention is a method of using a combination of furnaces operated under unique process conditions to effect the continuous beneficiation of titanium oxides of low-grade titanium materials having iron oxides, such as ilmenite. The term low-grade refers to the relative percentage of titanium dioxide present in the starting material (ore), wherein low-grade generally is less than 70% by weight. In the method, agglomerates comprised of low-grade titanium materials, and especially $Fe^{II}Ti^{IV}O_3$ complexes, and a reductant are combined and reduced in a DRI shaft furnace or from a rotary hearth furnace or a calcination kiln.

The present invention is described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will convey the scope of the invention fully to those skilled in the art. Like numbers refer to like elements throughout.

Figure 1:
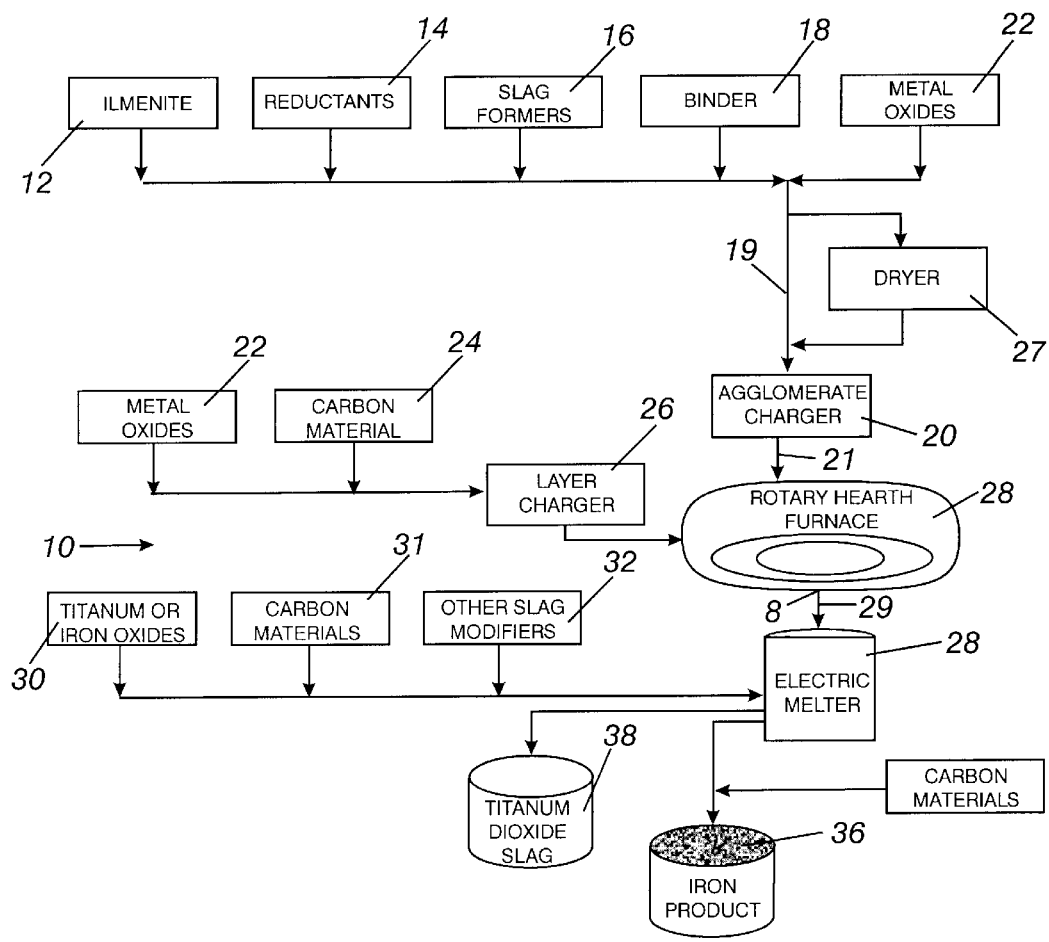
FIG. 1 is a flowchart of the method for producing high purity iron according to this invention.

Referring now to FIG. 1, the overall method 10 uses a first and a second hot process to produce the desired end product. The input materials consist of: ilmenite 12 or other titanium or iron bearing materials thereof 22 (e.g. metal oxides); reductants 14 such as coal powder, coal fines, and other carbonaceous materials; slag formers 16, such as $SiO_2$, CaO, $Al_2O_3$, $CaF_2$ (fluorspar) and/or MgO; and, optionally, a binder 18. These materials are formed into agglomerates 19, preferably in the form of uniformly-sized briquettes or pellets. The agglomerates 19 fill hopper 20 from which they are continuously conveyed to an input port of a moveable hearth furnace, which is shown as a rotary hearth furnace 28. The agglomerates 19 are placed in a layer or layers over the hearth surface 42. The hearth moves, progressing the material through two or more hot zones that effect a reduction of the oxides without the material becoming liquid, except under controlled conditions which result in carbon-containing liquid iron nuggets when such are needed. Pre-reduction is carried out at a temperature of from about 700° C. to approximately 1500° C. The exit material, pre-reduced iron, DRI of this first hot process is 70% to 100% metallized iron discharged at a temperature of approximately 700° C. to approximately 1350° C. The pre-reduced agglomerates 8 are conveyed directly, hermetically and continuously via feed leg 29 from the rotary hearth 28 to charge an electric melter 34. The pre-reduced agglomerates 8 are fed directly and continuously into the central portion of the melter 34 where it is liquified very rapidly (within seconds). The melter 34 further refines the liquid iron material as well. The assay of the final iron material can easily be modified by controlling conditions in the furnace. Slag modifiers 32 or carbon materials 31 may be used as necessary to control the final output material and/or the viscosity of the titanaceous slag 38. The melter is periodically tapped to remove a portion of the slag 38 and subsequently, the liquid iron product 36. Carbon materials 31 may be added upon tapping. The steps of the method produce beneficiated titanium dioxide, having less than 10% gangue, and high purity molten iron at an exit temperature of about 1300° C. to about 1700° C. within the ranges given in Table 1. The position within each range may be specified.

TABLE 1

| End Product | | |
|---|---|---|
| Fe | 98.8% | 93.4% |
| C | 1.0% | 5.0% |
| Si | 0.2% | 1.5% |
| S | ~0.0% | 0.10% |

The foregoing is a brief overview of the method. The details will now be developed in a discussion of the apparatus used.

Figure 2:
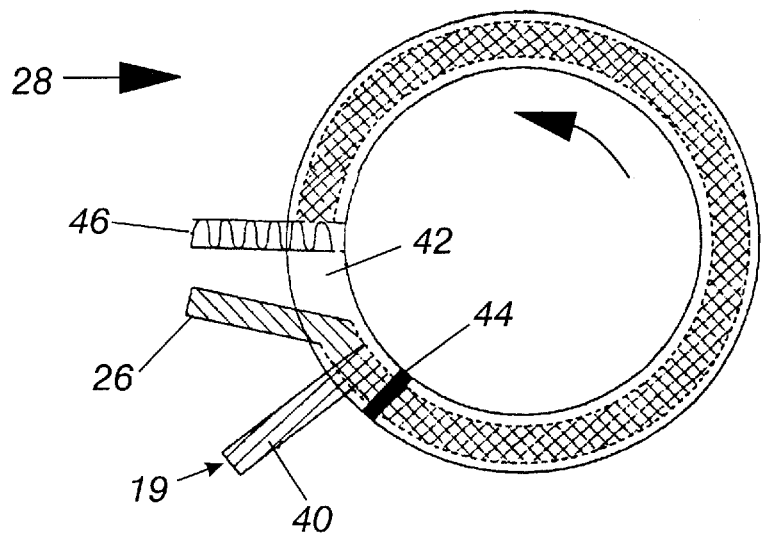
FIG. 2 is a diagrammatic top view of the moving hearth furnace in accordance with the invention.

Refer to FIG. 2 for the elements of the rotary hearth furnace 28. Heat processing may be accomplished by fixed gas burners, tilting gas burners or other devices for heating a furnace. The input materials from hopper 20 are agglomerates 19 that consist of ilmenite 12 and/or titanium or iron bearing materials thereof 22 (e.g. metal oxides), reductants 14 such as coal powder, coal fines, and other carbonaceous materials; slag formers 16 such as $SiO_2$, CaO, $Al_2O_3$, $CaF_2$ (fluorspar) and/or MgO, and a binder 18. The conveyor 26 may be a vibratory feed conveyor or other standard continuous belt, pneumatic or spiral conveyor of pellet-sized materials. The agglomerates 19 contain slag formers feed material 16 with CaO and/or MgO additions so that the C/S ratio (%CaO/%$TiO_2$) and/or "V" ratio (%CaO+%MgO)/(%$TiO_2$+%$Al_2O_3$), or can be tailored to a specific composition that then influences desulfurization of the bath by the slag generated in the melter.

The placement of the material within the rotary hearth furnace includes layering of the titanium and iron oxide bearing agglomerates 19 onto the hearth surface 42 in a single layer (100% loading) or multiple layers (e.g. 200% loading) using conveyor 40. The loading is accomplished by the rate at which agglomerates are delivered to the furnace in combination with the height of a leveler 44 above the hearth surface. This procedure lends itself to uniform heating of the agglomerates and produces uniform chemistry of the DRI product.

When greenballs (agglomerated pellets made by agglomerating fine titanium-iron-bearing materials with a binder) are to be charged to a moving hearth furnace, it is normally necessary to dry the greenballs, which may contain from about 10 to about 15% moisture by weight. Drying of the greenballs in dryer 27 avoids steam generation and breakage which occurs upon rapid heating. Also, since water (moisture) is an oxidant to metallic iron, utilizing a drying step prior to charging greenballs to the hearth furnace reduces the amount of oxidants within the reducing furnace. Compacts or briquettes do not require drying because the moisture content is only from about 1 to about 5% by weight. The use of cellulose fiber binders and briquetting produces a briquette with less than 2% moisture.

The metallized iron material discharged from the moving/rotary hearth furnace 28 of the pre-reducing step includes sulfur, phosphorus and metal oxide compounds from slag formers contained in the iron bearing feed materials, reductant ash. The hot DRI product contains sufficient carbon to accommodate carburization of the hot metal in the electric melter 34 as well as reduction of residual FeO and partial reduction (about 1% to about 99%) of other oxide species such as $TiO_2$, plus any excess carbon as required by the process. The temperature of the exit material being discharged from the moving hearth furnace 28 should preferably be in the range of approximately 700° C. to approximately 1350° C. The carbon-containing metallized iron product from the moving hearth furnace 28 is metallized to approximately 70% to 95% iron content on the hearth surface. The material is conveyed directly, continuously and hermetically to charge an electric melter by feed leg 29 which is a discharge conveyor.

Figure 4:
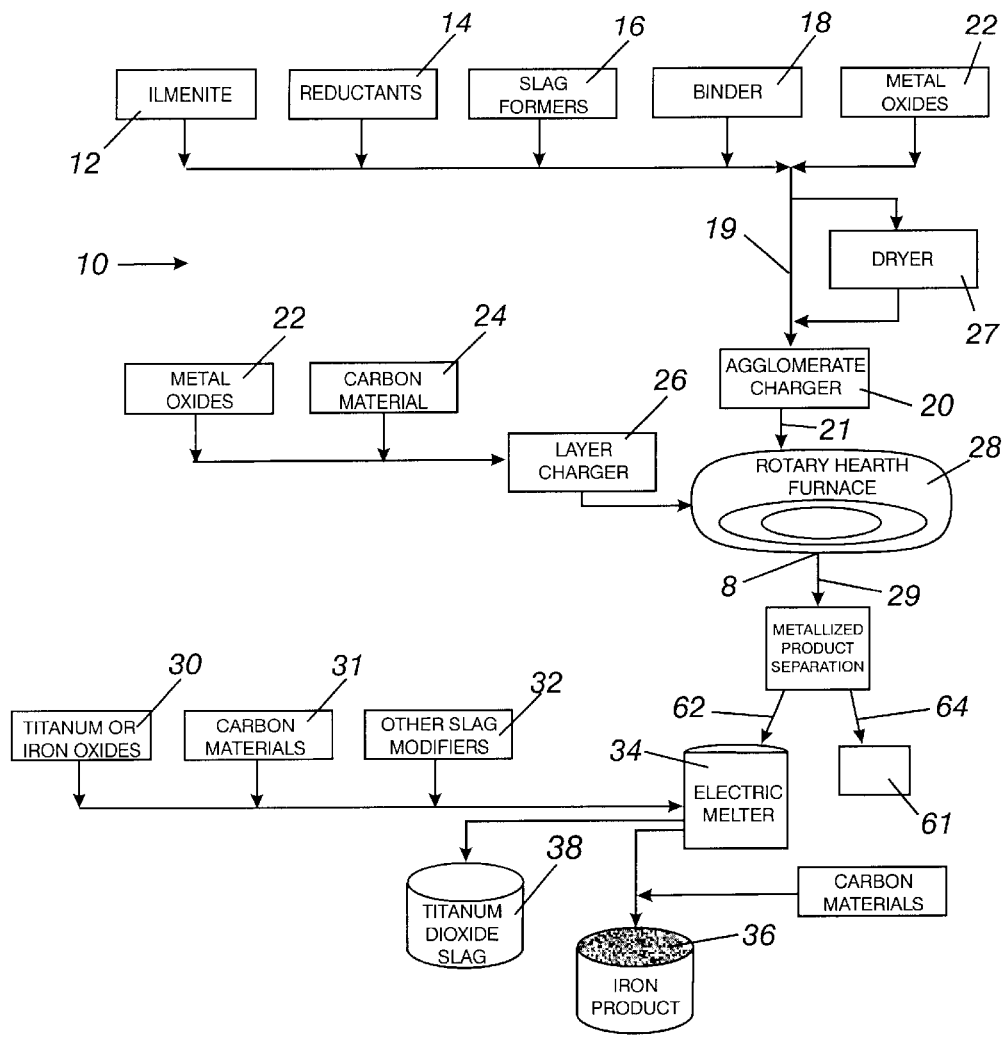
FIG. 4 is an alternative flowchart of the method for producing high purity iron according to this invention, and including nugget separation.

When carbon-containing iron nuggets are produced by the invented process, metallization of the product from the moving hearth furnace 28 approaches 100%. When carbon-containing iron nuggets are produced, as shown in FIG. 4, a separation step 60 may be employed in which the nuggets 62 are effectively removed from the moving hearth furnace product discharge stream. This separation step 60 minimizes the quantity of non-nugget carryover material 64 to the melter 34, which material 64 is collected in vessel 61.

Figure 3:
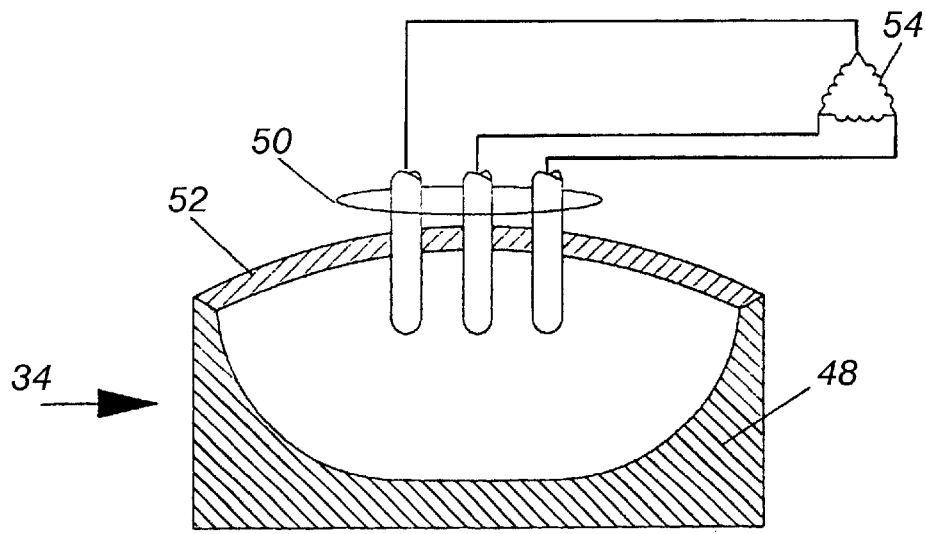
FIG. 3 is a vertical cross-section of a typical electric melter, a 3-phase electric arc furnace, for use with the invention.

Referring to FIG. 3, which is a diagrammatic cross section of a typical electric melter 34. Various types of electric melters can be adapted for this application. There are two basic types, arc types and induction types. Either type may be used. Electric arc types are preferred for use in the present invention. There are a number of variations in arc furnace designs. The type illustrated here is an electric arc furnace 34 that employs a non-conducting hearth 48 and three phase alternating current (AC) power 54. The furnace is used both for melting and refining the charge. The preferred furnace has an insulating roof 52, penetrated by electrodes 50. The illustrated electrodes are powered by a three-phase power source. Single phase AC and DC types may also be used. The secondary of the transformer that drives the electrodes 50 illustrates the fact that the power input, and therefore the temperature, is readily adjustable.

As part of the feeding step, hot pre-reduced agglomerates are directly charged to the electric arc melter 34, and directed preferably toward the center of the melter, near the region of arcing between the electrodes and molten iron bath. Additional carbon compounds 31 and slag modifiers 32, and metal oxides 30 (i.e. titanium dioxide and iron oxides) may be added to the electric arc melter, as necessary, to augment the composition of the hot DRI discharged from the rotary hearth furnace 28. Melting of DRI agglomerates occurs in mere seconds after being charged into the electric arc melter 34.

For the electric melter heating step, use of pre-baked carbon or graphite electrodes is preferred to Soderburg (self-baking) type electrodes. This simplifies operation, reduces capital expense and improves electrical efficiency. Maintaining atmospheric integrity includes eliminating or minimizing the ingress of air and other undesirable gases into the melter. Minimization of air ingress prevents reoxidation of reduced iron, molten iron and any other reduced species or alloyed species in the molten iron. For the electric arc melter, a special seal having purge gas capability may be utilized around the electrode delta or other electrode configuration where the electrodes 50 penetrate the melter through the insulating roof 52.

Since an electric melter is not dependent on combustion of fuels with air or oxygen enriched air, or post combustion of evolved combustibles from the molten iron bath with air, oxygen enriched air or oxygen, the reducing atmosphere is readily maintained. For example, some hybrid smelting reduction processes rely on the post-combustion of evolved CO and $H_2$ gases from a molten iron bath gasifier for energy input to process preheated iron ore and/or pre-reduced iron oxide bearing materials. In fact, combustion-based melting or smelting processes may produce combustion products which are in equilibrium with the molten iron, or favor reduction of iron oxide bearing materials, but may still be oxidizing to other reduced or alloyed species which are desirable components in the molten iron, e.g., species such as Si and Mn. In the invented method of operation, the electric melter 34 has a distinct advantage over the combustion-based melters and/or smelters.

As part of the heating step within the electric melter, a low density slag condition is maintained within the electric melter as a key process consideration because the low density slag promotes easy penetration of hot pre-reduced agglomerates or melted agglomerates into the electric melt zone. Furthermore, low density slag rapidly imparts a high heat transfer to the compacts, which improves the melting rate within the electric melter. The low density slag condition is created by reacting the small quantity of residual FeO contained in the pre-reduced agglomerates or melted agglomerates with the carbon in solution within the molten iron bath, or with carbon contained in the slag phase of the feed material, liberating carbon monoxide, CO, which causes the foaming of the slag. The extent of foaming of the slag within the electric melter depends on the metallization of the incoming DRI. A light degree of foaming of the slag occurs when the incoming DRI is not too highly metallized, i.e., the iron metallization level of the material is below 90%. If the incoming DRI is highly metallized, i.e., iron metallization levels greater than 90%, less foaming of the slag will occur, imparting a lower transfer of heat to the DRI. Since controlled foaming of slag within the electric melter is desirable, the optimal condition for the electric melter is to provide hot DRI agglomerates from the rotary hearth furnace which are in the range of iron metallization of 70% to 92%, but preferably in the range of 80% to 90%. This condition is preferred despite the fact that using higher metallization DRI requires less electrical energy for processing in the electric melter than lower metallization DRI.

As a benefit of the pre-reducing step, and the subsequent use of an electric melter furnace, the titanium oxides, $SiO_2$ and MnO contained in the hot DRI agglomerates directly fed to the melter are subjected to a melting environment in the electric melter 34 that may be manipulated to be conducive to reduction of $SiO_2$ and/or SiO to [Si] (silicon contained in molten iron), and reduction of MnO to [Mn] (Mn contained in molten iron) which becomes easily assimilated into the molten iron. The degree of silicon oxide and manganese oxide reduction is easily controlled by bath temperature, i.e., the higher the temperature, the higher the extent of titanium dioxide, silicon oxide or manganese oxide reduction, and the greater the rate of titanium, silicon and manganese pick-up in the liquid iron bath. The electric melter bath temperatures can be controlled by varying the power input to the melter via the electrodes. It has been found that small additions of iron oxide 30 to the melter during the normal course of melting carbon-containing pre-reduced iron has the effect of arresting the reduction of titanium dioxide, silica, manganese oxide, and other metal oxides. Generally, it is desired to minimize the addition of silicon oxides, aluminum oxides, and other slag conditioning materials 32 as these materials lower the overall concentration of titanium oxides in the slag.

The electric melter 34 should maintain a molten iron heel of about 1 to about 4 times the tapped metal quantity. The optimal temperature for normal operations of the electric melter for reducing silicon oxides is the temperature range of approximately 1450° C. to approximately 1550° C. at the tap. The furnace is tapped periodically for both hot metal and titanaceous slag without interrupting the continuous charging and melting operations. The tapholes are then resealed using methods known in the art.

The optimum operation of the electric melter 34 requires minimizing the ingress of oxygen while maintaining the temperatures outlined above. The output of the improved method 10 is high purity iron 36 having a desirably low, specified maximum sulfur content and specified carbon, and also titanium dioxide 38 of a relatively higher purity. Titanium oxide slag 38, having low concentrations of iron, is separated within the electric melter 34 and removed separately from the high purity iron product 36. Low sulphur content iron having the above described characteristics including a high carbon content is extremely desirable to steelmakers because normal desulfurization in the steelmaking vessel is either minimized or unnecessary. The above described method of operation leads to both increased productivity of higher purity iron product and lower operating costs in the steelmaking industry.

DETAILED DESCRIPTION OF THE ALTERNATIVE EMBODIMENT

Figure 5:
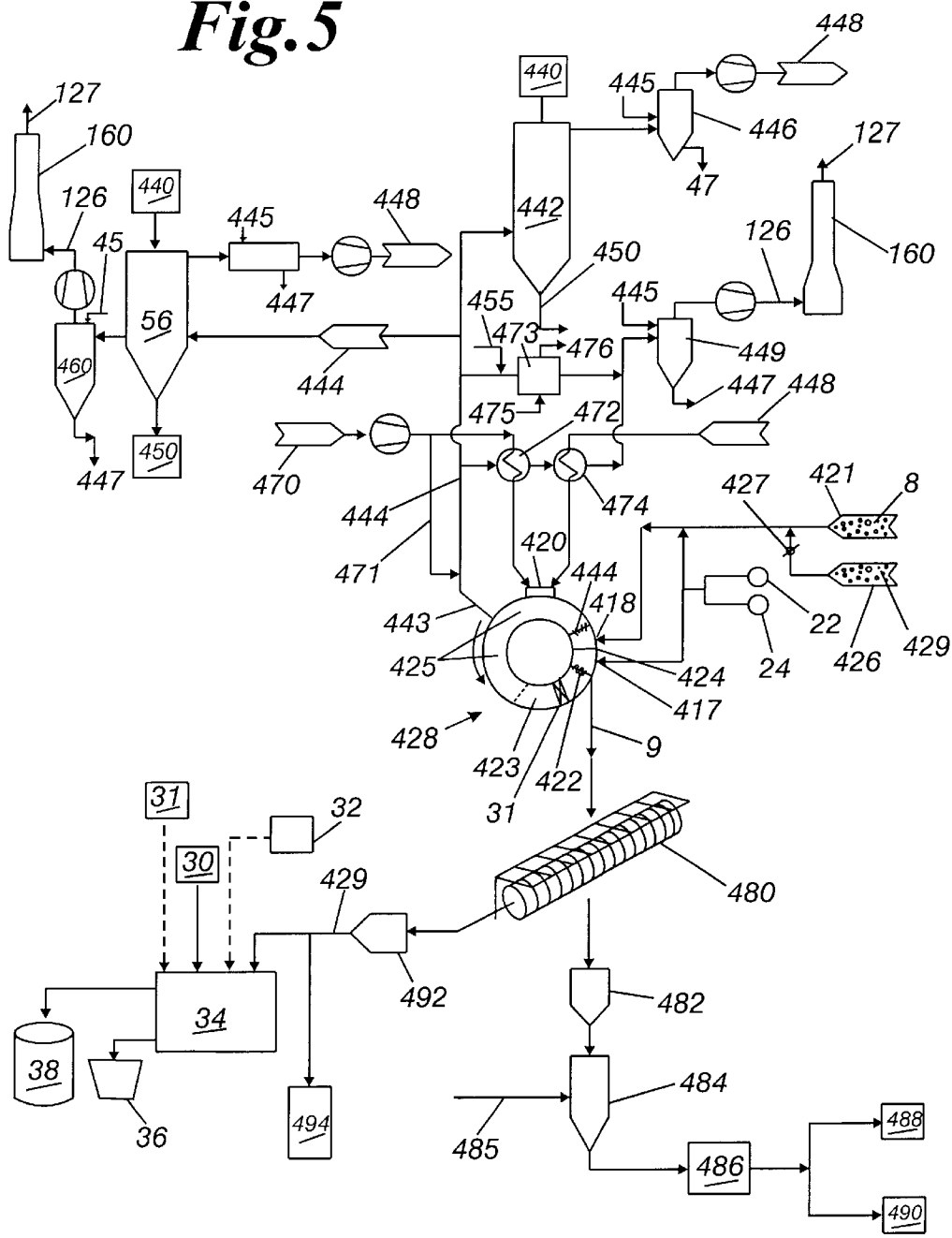
FIG. 5 is a schematic diagram of a titanium dioxide beneficiation process in accordance with the invention, utilizing hot pre-reduced agglomerates charge from the output of the process of FIG. 6, or cold, highly metallized DRI, or a blend of the two.
Figure 8A:
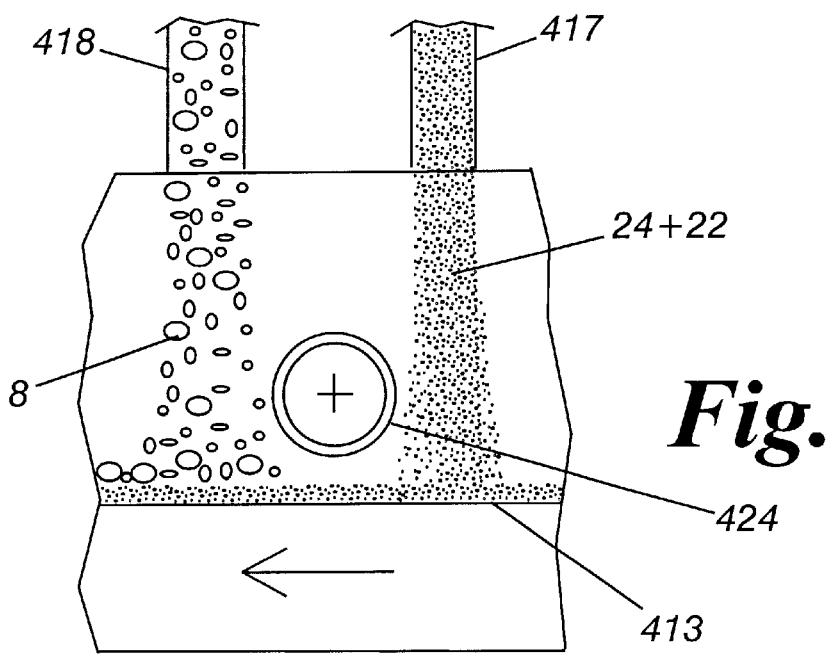
FIG. 8a is a sectional view of the FHM furnace, where sectional view
Figure 8B:
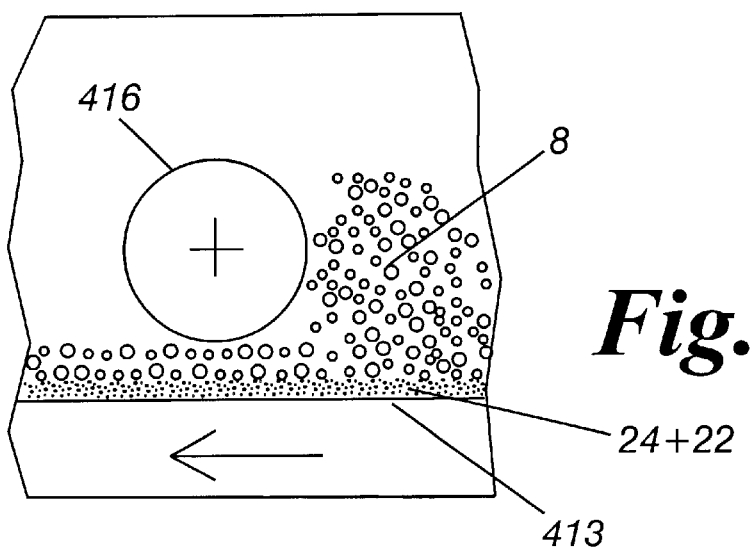
FIG. 8b is a sectional view of the FHM furnace, where sectional view
Figure 9:
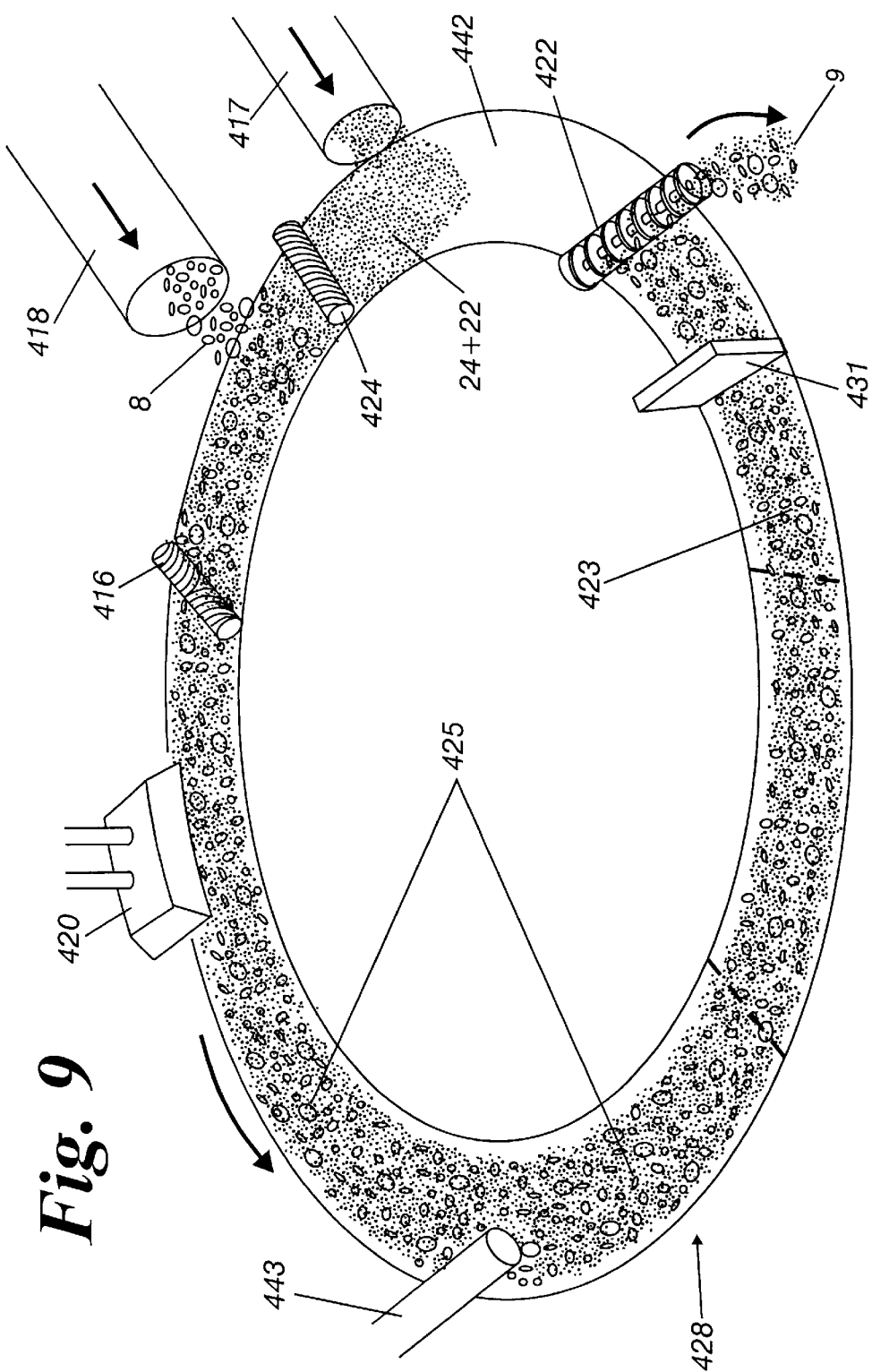
FIG. 9 is a diagrammatic planar view of the FHM furnace in accordance with the invention.

Referring now to FIG. 5, charge material 8, is preferably pre-reduced agglomerates that is about 70 to 90% metallized iron at a temperature of approximately about 700 to 1100° C. The pre-reduced agglomerates 8 are conveyed directly, hermetically and continuously from holding bin 421 to the FHM furnace 428, which is shown as a rotary hearth furnace. The FHM furnace 428 shown in FIG. 9 rotates counterclockwise when viewed from the perspective of the reader. An enlarged overhead view of FHM furnace is shown in FIG. 9, and sectional views of the FHM furnace are shown in FIGS. 8a and 8b. The FHM furnace 428 is provided with a pellet leveler 416 near the charge feed entrance 418. The pellet leveler 416 is preferably a screw device with flights, spikes nubs, etc. to assist in gently moving the feed materials 8 to preferably a single layer. The FHM furnace is provided with appropriate burners 420 or other heating devices, and a product discharge device 422, which preferably is an auger. Cold, highly metallized DRI or other metallized iron-bearing product 429 from storage bin 426 may also be fed into the conveyance system for the furnace along with hot, pre-reduced agglomerates charge, or other titanium metallized iron agglomerate charge material from holding bin 421. Hearth conditioning carbonaceous materials, comprised of a hearth conditioner 24 such as graphite, anthracite coal, petroleum coke, coke breeze, etc., and may also contain refractory compounds 22 such as $SiO_2$, CaO, alumina, bauxite, $CaF_2$ (fluorspar), magnesia, magnesite, etc. which may be fed into the furnace with the charge materials 8. Refractory compounds 22 and hearth conditioners 24 also can be dispersed on the hearth surface 413 of FIGS. 8a and 8b (which can also have refractory or residual hearth conditioning material) of the FHM furnace 428, through material feeder 417, ahead of the pre-reduced agglomerates charge feeder 418. An optional hearth conditioner/refractory compounds smoothing device 424, as shown in FIG. 9, can be used to prepare a smooth surface prior to charging the pre-reduced agglomerates 8 and other metallized iron-bearing product 429. The smoothing device 424 is preferably an auger-screw device. The pre-reduced agglomerates are preferably dusted with powdered carbonaceous materials. Calcium oxide (lime) can be added to further lower the level of sulfur in the iron and the nascent slag, however, calcium oxide is to be used very sparingly as it will ultimately end up in the slag. Under most cases the sulfur level is sufficiently low as consequence of selecting a natural gas DRI for a charge material, that a sulfur scavenger is not required.

The pre-reduced agglomerates charge material 8, along with hearth conditioning materials, is distributed by the pellet leveler 416. The FHM furnace hearth conveys the pre-reduced agglomerates charge material into the burner zone 425. The burner 420 is fired with fuel gas 448 and combustion air 470. Combustion gases ($CO_2$ and $H_2O$), in the presence of carbonaceous materials, such as coal, petroleum coke, graphite, or char, are converted to reductants, CO and $H_2$. The carbonaceous material facilitates melting of the pre-reduced agglomerates charge material 8 at relatively low temperatures, on the order of 1350° C. The reductants and the carbonaceous material complete the reduction of any remaining iron oxide to iron. Laboratory data results show that the melting/reduction process occurs when the carbon content is about 1.5 to 3.5 percent, at a temperature of 1350° C. to 1450° C. To achieve similar melting using a blast furnace, which generally operates in the range of 4.2 to 4.8% carbon, requires temperatures in excess of 1420° C. It has been postulated that the lower melt temperature is partially a consequence of the presence of the reductant gases, and particularly carbon monoxide. To appreciate how low the process melt temperature is the reader is reminded to consider that the melting point of pure iron is 1535° C., cast iron 1000 to 1300° C., wrought iron 1500° C. and carbon steel 1520° C., and titanium dioxide has a melting temperature of 1825° C. to 1830° C. Titanium oxide has a slightly lower melting temperature of 1750° C., which suggests that some of the titanium IV is reduced to titanium II and III.

When the pre-reduced agglomerates charge material 8 melts, the surface tension of iron is sufficiently high that, instead of simply flowing together to form a sheet of iron, the iron beads up, like water on a hydrophobic surface, forming a liquid nugget. Titanaceous slag forms and migrates upward forming a cap on the liquid nugget, or flows completely away from the liquid iron nugget, thereby forming a slag button. The volume of the titanaceous slag per melted agglomerate is comparable or larger in volume of the iron nugget. Because the pre-reduced agglomerates charge material 8 is already hot, and only a small portion of the iron oxides still need to be reduced, the melting and finishing is accomplished in a very short time frame. The cycle time in the FHM furnace 428 is typically 3–12 minutes, with 6 minutes being nominal.

Between burner zone 425 and the last zone 423 of the FHM furnace 428 there is a hot flue gas take-off 443, where the furnace gases are vented to the heat recovery systems. The last zone 423 of the furnace 428 is substantially cooler, afforded by a chill device, which preferably is a chill plate 431. In last zone 423 the liquid nuggets and slag re-solidify. As shown in FIG. 5 and FIG. 9, the discharged melted agglomerate 9 of the FHM furnace process, as well as the hearth conditioners 428 and the refractory compounds 430, are collected and conveyed via an auger 422 to a water cooled hot screen 480. The hot screen 480 diverts the undersize product 482 to a cooler 484, and the oversize product 492 directly to the final melter 34 or to the collector 494 for processing later or inventorying. Table 2 lists typical properties of the melted agglomerate 492.

TABLE 2

| Titanaceous Slag Chemical Composition | (Weight %) |
|---|---|
| TiO$_2$ TiO Ti$_2$O$_3$ | 92.5% |
| Fe | 1.5% |
| Gangue | 6.0% |

The cooler 484 is preferably an indirect inert gas purged rotary cooler, where the preferred inert gas is nitrogen 485. Cooled, undersize product 482 is passed through a magnetic separator 486, which pulls out mini-melted agglomerate 490 from spent material 488, which consists substantially of refractory compounds 22 and hearth conditioners 24. Spent material 488 is only partially spent, and can accordingly be recycled as hearth conditioning materials. As an alternative, undersize product 482 can be recycled hot to the FHM furnace 28.

The oversize melted agglomerate 492 is fed to a final melter, which is preferably an electric arc furnace 34 (as previously shown in FIG. 3). Additional carbon compounds 31, metal oxides 30 (i.e. titanium dioxide and iron oxides), and slag modifiers 32, including lime, silicates, and fluxing agents, may be added to the electric arc melter, as necessary. The electric arc melting furnace 34 is tapped on the top to draw off titanaceous slag 101, and on the bottom to draw off liquid iron 36.

The invention has heat generation, recovery and conservation systems, where energy generated for the FHM furnace is recovered and used to convert coal into fuel gases, hearth conditioning materials and other carbonaceous materials, electricity, and to augment other energy intensive process.

Coal 440 is fed into calciner 442, which is fueled by hot gas, preferably tempered flue gas 444 (through the addition of air 470 to furnace hot flue gas take-off gases 443) from FHM furnace 428. Off gas from the calciner is cleaned and scrubbed by scrubber 446, and is recovered as a fuel gas 448. Input water 445, for scrubber 446, discharges as outlet water 447. Fuel gas 448 and air 470 are provided to the furnace burners 420. The air 470 and the fuel gas 448 are preheated respectively by heat exchangers 472 and 474, which derive heat from the tempered flue gas 444. Solid output from the calciner 442 is char 450, which is incorporated into the hearth conditioners 24.

A coal heater/devolatilizer 456 is fed with coal 440, and is fueled by hot gas, preferably tempered flue gas 444 from furnace 428. The output of the heater/devolatilizer 456 is hearth conditioning char 450, which is incorporated in the hearth conditioners 428 for further use. A portion of the off-gas 443 from the lower part of the heater/devolatilizer 456 is cleaned and scrubbed by scrubber 460, and is recovered or discharged through stack 160 as flue gases 127. Input water 445, for scrubber 460, discharges as outlet water 447. The portion of the off-gas from the upper portion of the heater/devolatilizer 456 is cooled and scrubbed in cooler-scrubber 462 and is recovered as fuel gas 448 for the burners 420. Input water 445, for scrubber 460, discharges as outlet water 447.

The invention provides for an effluent scrubber 449, which can serve as a tertiary scrubber for flue gases wherein a mist of water 455 is admixed with the tempered flue gas 444 prior to treatment in scrubber 449. Alternatively, tempered flue gas 444 could be utilized in a cogeneration scheme whereby the sensible heat is converted to steam 476 by way of heating boiler feed water 475 in a waste heat boiler 473. The generated steam 476 could then be converted into electricity by means of employing standard cogeneration technology. Input water 445, for scrubber 449, discharges as outlet water 447. Cooled/cleaned flue gas 126 is vented through stack 160 as stack gas 127.

Figure 6:
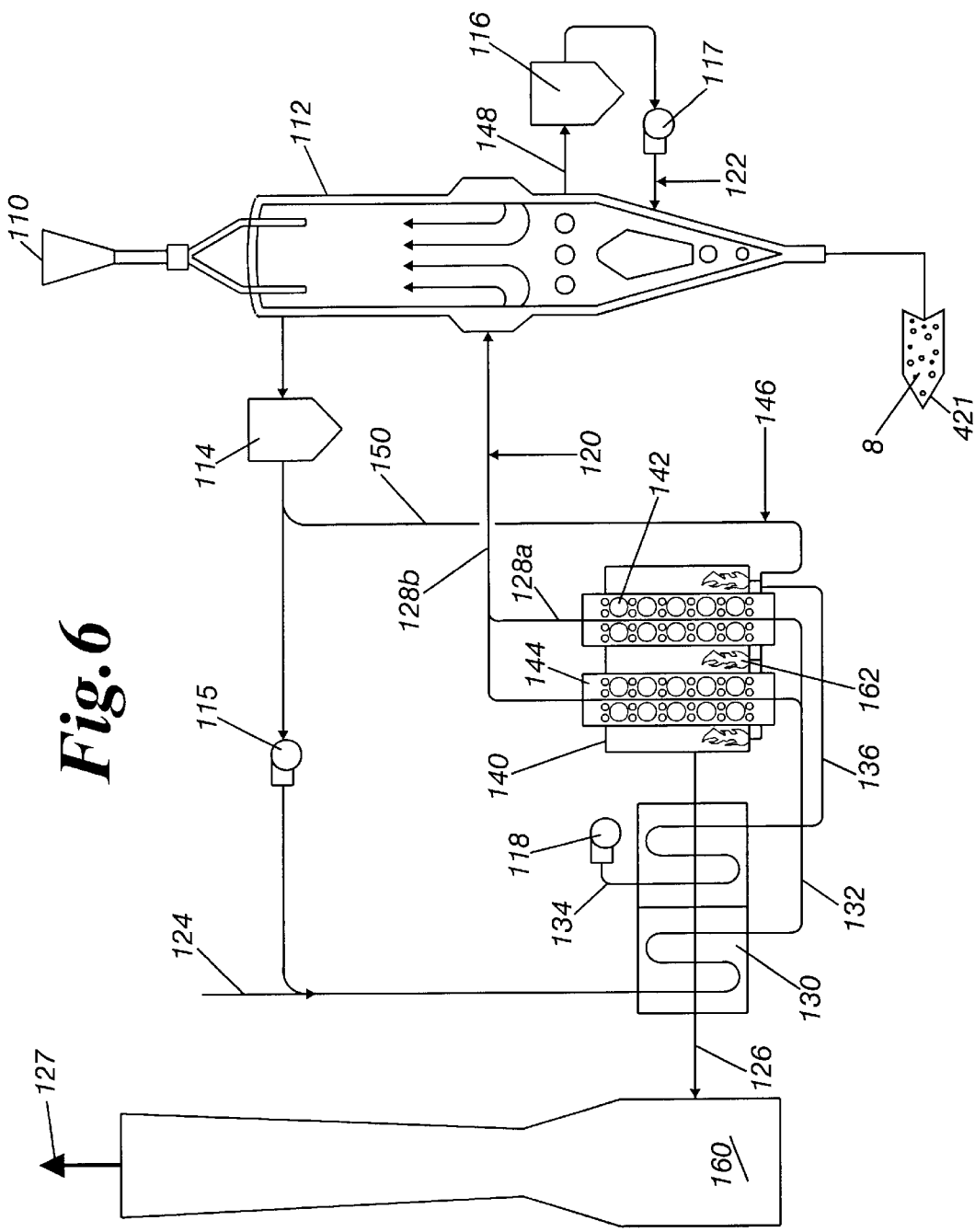
FIG. 6 is a schematic diagram of a shaft furnace direct reduction plant which produces hot pre-reduced agglomerates for beneficiating low-grade titanium ores, such as ilmenite.

FIG. 6 shows a suitable means for preparing the pre-reduced agglomerate charge material 8 ilmenite 12 (in the form of fines, sand, pellets and/or lump ore) are fed to a conventional gas or coal-based direct reduction furnace 112; e.g., a Midrex shaft furnace, rotary kiln, fluid bed, etc., for the production of highly reduced DRI 8 or other reduced iron material such as iron carbide (hot or cold). Shown in FIG. 6 is a DRI shaft furnace 112. Agglomerates of ilmenite 12 are loaded through the top of the shaft furnace and exits the bottom as pre-reduced agglomerates 8. The bustle gas is a formed from the reformed gas 128 (128*a* & 128*b*) and, optionally, natural gas and oxygen 120. Gases in the lower portion of shaft furnace 112 are cycled via line 148 through cooler 116, pressurized by compressor 117 and injected back into the lower portion of the furnace. Natural gas 122 may optionally be added to these gases. Gases in the upper portion of the shaft furnace are recycled and refurbished through the top gas scrubber 114. The top gases are compressed 115, admixed with natural gas 124, warmed with heat exchanger 130, forming 132, prior to passing through the reformed gas catalyst tubes 144 and 142. The reformed gas catalyst tubes are heated in a reformed gas furnace 140. The reformed gas furnace 140 has burners 162, which burn compressed air 118, that is pre-heated in line 134 via the heat exchanger 130 forming heated air 136, and natural gas 146.

The burners 162 can also be admixed with top gases conveyed by line 150. The reformed gas furnace combustion gases 126 exhaust through the heat exchanger 130, and into the stack 160, where they exit as flue gas 127.

Figure 7:
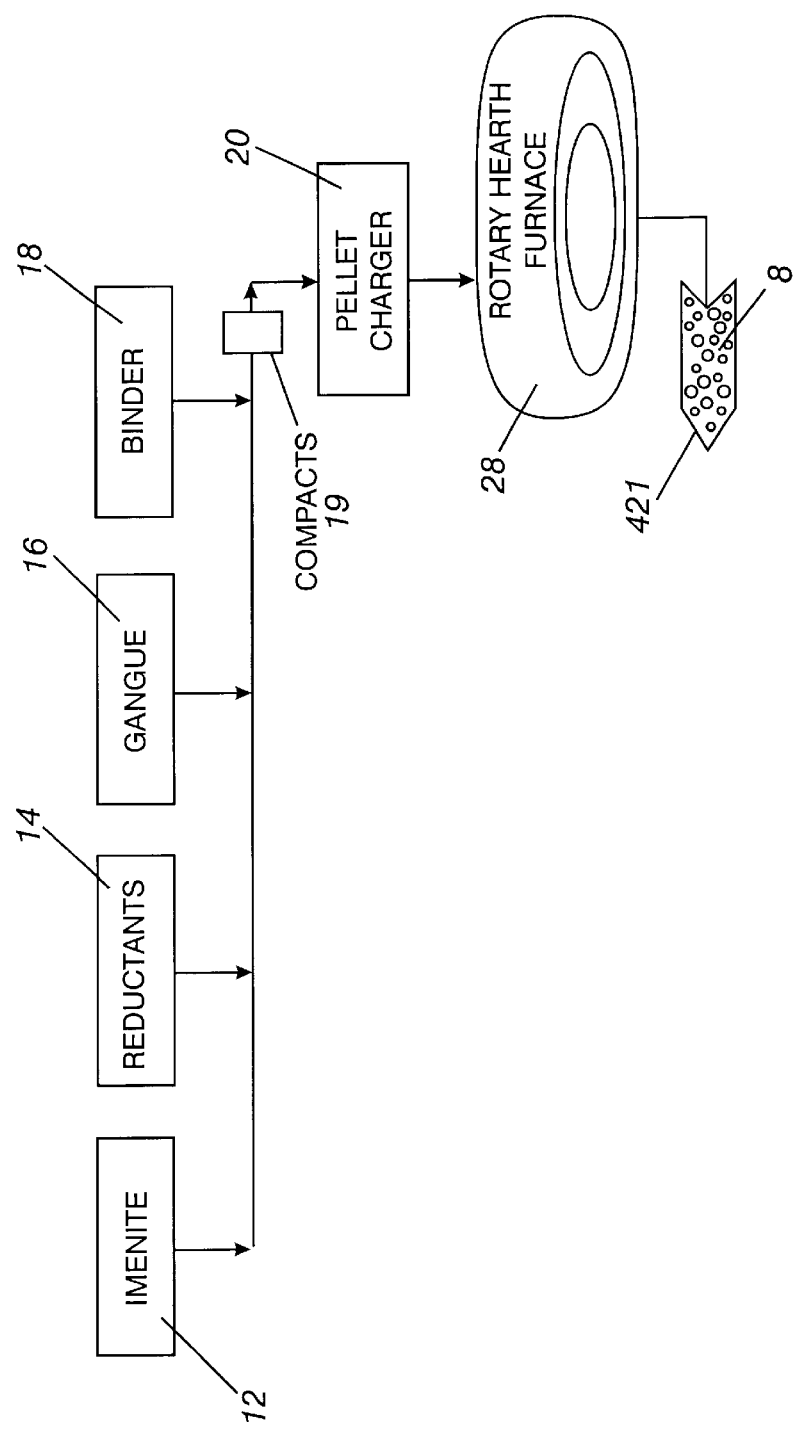
FIG. 7 is a schematic diagram of a rotary hearth furnace direct reduction plant which produces hot pre-reduced agglomerates.

The pre-reduced agglomerates charge material 8 can alternatively be generated via a DRI rotary hearth furnace 328, as shown in FIG. 7. Referring now to FIG. 7, the input materials consist of: ilmenite 12 or titanium and iron oxide bearing waste materials 22; reductants 14 such as carbonaceous material including coal powder, coal fines, and other carbonaceous materials; slag formers 16 such as $SiO_2$, CaO, $Al_2O_3$, $CaF_2$ (fluorspar) and/or MgO; and a binder 18, cellulose fibers and water. These materials are formed into compacts 19, preferably in the form of uniformly-sized briquettes or pellets. The compacts fill hopper 20 from which they are continuously conveyed to an input port of a rotary hearth furnace 28. The titanium oxide bearing compacts 19 are placed in a layer or layers over the hearth surface. The hearth rotates, progressing the material through two or more hot zones that effect a reduction of the iron oxides without the material becoming liquid. The exit material (pre-reduced agglomerates) is titanium oxides and pre-reduced iron. The DRI (direct reduced iron) of this first hot process is about 70% to 95% of the available iron. The exit temperature is approximately 700° C. to approximately 1100° C. The pre-reduced agglomerates are conveyed directly, hermetically and continuously to holding bin 21, and then onto the FHM furnace 428, shown in FIG. 4 and FIG. 9.

It is anticipated that heat recovery means, such as the recycling of off gases from the FHM furnace and the DRI shaft furnace or DRI rotary hearth furnace, can be shared amongst the support systems supplementing the overall method of titanium dioxide benefication, iron-making and steel-making. For instance, while not particularly described, it is anticipated that under some circumstances it may be more efficient to use off-gas from the FHM furnace to heat reformed gases than to heat a coal calciner, if so, then the off-gas will be diverted to the reformed gas furnace 140.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A method for producing beneficiated titanium oxides from low-grade titanium materials containing iron and iron oxides thereof, comprising the steps of:
    (a) forming agglomerates comprised of carbon based materials and low-grade titanium materials containing iron and iron oxides thereof;
    (b) pre-reducing said agglomerates, by heating said agglomerates at a temperature of about 700° C. to about 1500° C., therein producing pre-reduced agglomerates comprised of titanium oxides and at least partially metallized carbon-containing iron;
    (c) discharging said pre-reduced agglomerates at a temperature of about 700° C. to about 1350° C.;
    (d) providing a moving hearth furnace having a refractory surface;
    (e) introducing finely divided carbonaceous materials into said hearth furnace and uniformly placing said hearth conditioning carbonaceous materials on said refractory surface;
    (f) charging the refractory surface of the hearth furnace with the pre-reduced agglomerates;
    (g) heating and reacting said pre-reduced agglomerates in said hearth furnace to a temperature sufficient to complete the reduction of oxides of titanium to titanium II, III or IV, and the metallization of iron, wherein said heating produces a melted agglomerate of solid iron product and titanaceous slag, wherein the solid iron product is substantially comprised of iron and the titanaceous slag is substantially comprised of titanium oxides; and
    (h) discharging the melted agglomerate into an electric melter;
    (i) heating and melting the pre-reduced high carbon hot metallized iron agglomerates in the electric melter at a temperature of about 1300° C. to about 1700° C. to form high carbon molten iron and fluid slag which is rich in titanium oxides;
    (j) preventing oxidation of the high carbon molten iron via minimization of the ingress of oxygen containing gas in said continuously introducing and heating steps;
    (k) carburizing the high carbon molten iron to form high carbon molten metallized iron;
    (l) purifying the high carbon molten metallized iron by reducing titanium oxides to titanium II, III or IV and desulfurizing the high carbon molten metallized iron to produce high purity high carbon molten iron product;
    (m) discharging high purity high carbon molten iron product from the electric melter and tapping the melter to draw off beneficiated titanium oxides; and
    (n) maintaining a minimum molten iron heel of about 1 to about 4 times the quantity of the intermittently tapped iron product.

2. A method according to claim 1, further comprising:
    screening the discharged melted agglomerate from said hearth furnace to separate oversize and undersize product; and
    recovering the undersize product.

3. A method according to claim 1, further comprising conditioning the hearth surface with a carbon based material.

4. A method according to claim 3, wherein said carbon based conditioning material is selected from the group consisting of graphite, anthracite coal, petroleum coke, and char.

5. A method according to claim 1, further comprising conditioning uniformly the hearth with refractory compounds selected from the group consisting of alumina, bauxite, magnesia, and magnesite.

6. A method according to claim 1, further comprising coating or dusting the outer surface of the pre-reduced agglomerates with a carbonaceous material prior to it being charged onto the hearth surface.

7. A method according to claim 2, further comprising introducing the oversize product into a melting furnace, and forming a fluid slag rich in titanium and molten iron therein.

8. A method according to claim 1, where after introducing the carbonaceous materials, the carbonaceous materials are uniformly placed using a smoothing device, that preferably is an auger-screw device, to form a level smooth surface.

9. A method according to claim 1, where after charging, the pre-reduced agglomerates are leveled using a pellet leveler, where said pellet leveler is preferably a screw device with flights, spikes nubs, etc. to assist in gently moving the pre-reduced agglomerates materials to preferably a single layer.

10. Apparatus for producing beneficiated titanium oxides from low-grade titanaceous materials containing iron and iron oxides thereof, comprising:

(a) means for pre-reducing agglomerates comprised of carbon based materials and low-grade titanium materials containing iron and iron oxides material to a pre-reduced agglomerate containing metallized iron material;

(b) a moving hearth furnace having a refractory surface;

(c) means for introducing carbonaceous materials into said hearth furnace and placing said carbonaceous materials on said refractory surface;

(d) means for charging pre-reduced agglomerate into said hearth furnace on said refractory surface;

(e) means for heating and reacting said pre-reduced agglomerate in said hearth furnace, to form a melted agglomerate of substantially titanium oxide product and a metallized substantially iron product having a carbon content of 0.01–4%; and (f) means for discharging said melted agglomerate from said hearth furnace.

11. Apparatus according to claim 10, further comprising:
means for screening the discharged stratified composition from said furnace to separate oversize and undersize product; and
means for recovering the undersize product.

12. Apparatus according to claim 11, further comprising:
a melting furnace;
means to introduce said oversize product into said melting furnace, and to form molten steel and fluid slag comprised of titanium oxide therein.

13. Apparatus according to claim 12, wherein said melting furnace is an electric furnace.

14. Apparatus according to claim 12, wherein said melting furnace is a channel induction furnace.

15. A method for producing beneficiated titanium oxides from low-grade titanaceous materials containing iron and iron oxides thereof, comprising the steps of:

(a) distributing hearth conditioning material on a refractory surface of a FHM furnace, where hearth conditioning materials are comprised of carbonaceous materials;

(b) charging pre-reduced agglomerate comprised of titanium oxides and at least partially metallized carbon-containing iron onto the hearth conditioning material;

(c) heating and reacting said pre-reduced agglomerates in said hearth furnace to a temperature sufficient to complete the reduction of oxides of titanium to titanium II, III or IV, and the metallization of iron, wherein the heating produces a melted agglomerate of solid iron product and slag, wherein the solid iron product are solid nuggets substantially comprised of iron and the slag is substantially comprised of titanium oxides; and (d) cooling and discharging the melted agglomerate containing solid nuggets, slag and hearth conditioning material from said FHM furnace.

16. A method according to claim 15, further comprising:
screening the melted agglomerate from said FHM furnace to separate oversize and undersize product;
recovering the undersize product; and
recovering the hearth conditioning materials.

17. A method according to claim 15, further comprising hearth conditioning materials, where the hearth conditioning material promotes slag desulfurization.

18. A method according to claim 15, wherein said carbonaceous material is selected from the group consisting of graphite, anthracite coal, petroleum coke, and char.

19. A method according to claim 15, further comprising conditioning the hearth surface with refractory compounds selected from the group consisting of $SiO_2$, CaO, alumina, bauxite, $CaF_2$ (fluorspar), magnesia and magnesite.

20. A method according to claim 15, further comprising coating or dusting the outer surface of the pre-reduced agglomerates with a powdered carbonaceous material prior to its being charged onto the refractory surface.

21. A method according to claim 16, further comprising introducing the oversize product into a melter furnace, and forming molten steel and fluid slag, which is enriched with titanium oxides therein.

22. A method according to claim 15, wherein said pre-reduced agglomerate is hot DRI product from a shaft furnace.

23. A method according to claim 15, wherein said pre-reduced agglomerate is hot DRI product from a rotary hearth furnace.

24. A method according to claim 15, wherein said FHM furnace is a modified rotary hearth furnace that is heated via burners that that burn fuel gas and air producing combustion gases.

25. A method according to claim 24, where said combustion gases in the presence of carbonaceous materials are partially converted to at least one reductant, where at least one reductant is carbon monoxide.

26. A method according to claim 25, where carbon monoxide reacts with residual iron oxide to form iron.

27. A method according to claim 25, further comprising:
recycling off-gas from the FHM furnace to provide heat for support processes such as calcining coal to form fuel gas and hearth conditioning materials, warming combustion air, and heating a coal heater/devolatilizer.

28. A method according to claim 15, where said distributing hearth conditioning material on the refractory surface of the FHM furnace, further comprises using a smoothing device, that preferably is an auger-screw device, to form a level smooth surface.

29. A method according to claim 15, where said pre-reduced agglomerate which is charged on the hearth conditioning material is leveled using a pellet leveler, that preferably is a screw device to assist in gently moving the said pre-reduced agglomerates materials forming a single layer on the refractory surface of the FHM furnace.

30. A method according to claim 1, wherein said agglomerate is further comprised of a binder.

31. A method according to claim 1, wherein said binder is comprise of cellulose fiber.

32. A method for producing beneficiated titanium oxides from low-grade titanium materials containing iron and iron oxides thereof, comprising the steps of:

(a) forming agglomerates comprised of titanium oxides, iron bearing, carbon containing materials, silicon oxide, manganese oxide and sulfur;

(b) preparing a hearth surface of a moving hearth by charging the hearth surface with metal oxides and carbon containing materials, therein forming a carbon-metal oxide layer;

(c) charging the moving hearth having the hearth surface with the agglomerates from said forming step onto the carbon-metal oxide layer on the moving hearth furnace;

(d) pre-reducing the agglomerates in the moving hearth furnace by heating the agglomerates to form pre-reduced agglomerates with high carbon hot metallized iron;

(e) discharging the pre-reduced agglomerates from the moving hearth furnace at a temperature of about 700° C. to about 1100° C.;

(f) separating and collecting the pre-reduced agglomerates from the carbon-metal oxide layer, where the carbon containing material is now spent;

(g) continuously introducing the pre-reduced agglomerates directly from the moving hearth furnace into an electric melter;

(h) heating and melting the pre-reduced high carbon hot metallized iron agglomerates in the electric melter at a temperature of about 1300° C. to about 1700° C. to form high carbon molten iron and fluid slag which is rich in titanium oxides;

(i) preventing oxidation of the high carbon molten iron via minimization of the ingress of oxygen containing gas in said continuously introducing and heating steps;

(j) carburizing the high carbon molten iron to form high carbon molten metallized iron;

(k) purifying the high carbon molten metallized iron by reducing titanium oxides to titanium II, III or IV and desulfurizing the high carbon molten metallized iron to produce high purity high carbon molten iron product;

(l) discharging high purity high carbon molten iron product from the electric melter and tapping the melter to draw off beneficiated titanium oxides; and (m) maintaining a minimum high purity high carbon liquid iron heel of about 1 to about 4 times the quantity of the intermittently tapped high purity high carbon molten iron product.

33. The method of claim 32, wherein the collected layer of metal oxides and spent carbon containing materials is recycled to the step of preparing a moving hearth.

* * * * *